US012807851B2

(12) United States Patent
Ostlund et al.

(10) Patent No.: US 12,807,851 B2
(45) Date of Patent: Nov. 24, 2026

(54) COMPOSITION INCLUDING CYCLIC IMIDE-CONTAINING MONOMER AND ORGANOBORANE COMPLEX AND RELATED ARTICLES AND METHODS

(71) Applicant: 3M INNOVATIVE PROPERTIES COMPANY, St. Paul, MN (US)

(72) Inventors: Anthony J. Ostlund, Forest Lake, MN (US); Vivek Krishnan, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/564,661

(22) PCT Filed: Jun. 2, 2022

(86) PCT No.: PCT/IB2022/055150

§ 371 (c)(1),
(2) Date: Nov. 28, 2023

(87) PCT Pub. No.: WO2022/254369

PCT Pub. Date: Dec. 8, 2022

(65) Prior Publication Data

US 2024/0271021 A1 Aug. 15, 2024

Related U.S. Application Data

(60) Provisional application No. 63/196,056, filed on Jun. 2, 2021.

(51) Int. Cl.

| | |
|---|---|
| ***C09J 133/14*** | (2006.01) |
| ***B32B 7/12*** | (2006.01) |
| ***B32B 15/085*** | (2006.01) |
| ***B32B 15/18*** | (2006.01) |
| ***B32B 27/18*** | (2006.01) |
| ***B32B 27/32*** | (2006.01) |
| ***B32B 37/12*** | (2006.01) |
| ***C08F 220/28*** | (2006.01) |
| ***C09J 4/06*** | (2006.01) |
| ***C09J 5/00*** | (2006.01) |

(52) U.S. Cl.

CPC ............... *C09J 133/14* (2013.01); *B32B 7/12* (2013.01); *B32B 15/085* (2013.01); *B32B 15/18* (2013.01); *B32B 27/18* (2013.01); *B32B 27/32* (2013.01); *B32B 37/12* (2013.01); *C08F 220/281* (2020.02); *C09J 4/06* (2013.01); *C09J 5/00* (2013.01); *B32B 2250/02* (2013.01); *B32B 2264/101* (2013.01); *C08F 2800/20* (2013.01); *C09J 2400/166* (2013.01); *C09J 2423/108* (2013.01); *C09J 2433/00* (2013.01)

(58) Field of Classification Search

CPC .. C09J 133/14; C09J 5/00; B32B 7/12; B32B 27/32; B32B 37/12

See application file for complete search history.

(56) References Cited

U.S. PATENT DOCUMENTS

| | | | | |
|---|---|---|---|---|
| 3,496,250 | A | 2/1970 | Czerwinski | |
| 4,538,920 | A | 9/1985 | Drake | |
| 5,082,147 | A | 1/1992 | Jacobs | |
| 5,616,796 | A | 4/1997 | Pocius et al. | |
| 5,621,143 | A | 4/1997 | Pocius | |
| 5,935,711 | A | 8/1999 | Pocius et al. | |
| 6,252,023 | B1 * | 6/2001 | Moren | C08F 4/52 564/8 |
| 6,383,655 | B1 | 5/2002 | Moren | |
| 6,410,667 | B1 | 6/2002 | Moren | |
| 6,479,602 | B1 | 11/2002 | Moren | |
| 6,486,090 | B1 | 11/2002 | Moren | |
| 6,632,908 | B1 | 10/2003 | Maandi | |
| 6,734,268 | B2 | 5/2004 | Moren | |
| 6,740,716 | B2 | 5/2004 | Webb et al. | |
| 6,812,308 | B2 | 11/2004 | Deviny et al. | |
| 6,849,569 | B2 | 2/2005 | Moren | |
| 6,867,271 | B1 | 3/2005 | Maandi et al. | |
| 6,939,932 | B2 | 9/2005 | Kneafsey et al. | |
| 7,081,485 | B2 | 7/2006 | Suh et al. | |
| 7,098,279 | B2 | 8/2006 | Maandi et al. | |
| 7,341,285 | B2 | 3/2008 | Mcpherson | |
| 7,371,466 | B2 | 5/2008 | Kneafsey et al. | |

(Continued)

FOREIGN PATENT DOCUMENTS

| | | |
|---|---|---|
| CN | 102433094 A | 5/2012 |
| CN | 110157361 A | 8/2019 |

(Continued)

OTHER PUBLICATIONS

CAS 106646-48-2 Data Sheet. (Year: none).*

International Search Report for PCT International Application No. PCT/IB2022/055150, mailed on Sep. 22, 2022, 5 pages.

*Primary Examiner* — Catherine S Branch

(74) *Attorney, Agent, or Firm* — Kathleen B. Gross

(57) ABSTRACT

The composition includes a blend of monomers containing at least one of a cyclic imide-containing acrylate or a cyclic amide-containing methacrylate and an organoborane complex. The composition may be packaged as a two-part composition, wherein a first part comprises the blend of monomers, and wherein a second part comprises the organoborane complex. Articles are bonded with the composition, which is at least partially cured. Methods of making a bonded article are also disclosed. Bonded articles can include at least one low-surface-energy plastic.

20 Claims, No Drawings

(56) References Cited

U.S. PATENT DOCUMENTS

| | | | |
|---|---|---|---|
| 7,408,012 | B1 | 8/2008 | Kneafsey et al. |
| 7,896,568 | B2 | 3/2011 | Atkinson |
| 8,202,932 | B2 | 6/2012 | Kneafsey et al. |
| 8,415,425 | B2 | 4/2013 | Kanai |
| 10,266,726 | B2 | 4/2019 | Haufe |
| 10,913,247 | B2 | 2/2021 | Feng et al. |
| 2009/0053484 | A1 | 2/2009 | Yoshihiro et al. |
| 2010/0028806 | A1 * | 2/2010 | Patel .................... G03F 7/3035 430/283.1 |
| 2013/0267670 | A1 | 10/2013 | Xie |
| 2016/0347975 | A1 | 12/2016 | Irie |
| 2017/0323698 | A1 | 11/2017 | Hatakeyama |
| 2018/0237660 | A1 | 8/2018 | Irie |
| 2019/0211229 | A1 | 7/2019 | Xie et al. |
| 2019/0249038 | A1 | 8/2019 | Goubard |
| 2020/0102483 | A1 | 4/2020 | Hoshino |
| 2020/0243798 | A1 | 7/2020 | Matsushita |

FOREIGN PATENT DOCUMENTS

| | | | | |
|---|---|---|---|---|
| CN | 110358455 | A | 10/2019 | |
| JP | 2000-053906 | | 2/2000 | |
| JP | 2007-169560 | | 7/2007 | |
| JP | 4916681 | | 4/2012 | |
| JP | 2012-111907 | | 6/2012 | |
| JP | 2017-179125 | | 10/2017 | |
| JP | 2017179125 | A | 10/2017 | |
| WO | 2000056779 | A1 | 9/2000 | |
| WO | 2001032716 | A1 | 5/2001 | |
| WO | 2001032717 | A2 | 5/2001 | |
| WO | 2002034851 | A1 | 5/2002 | |
| WO | WO-02055622 | A2 * | 7/2002 | ................ C09J 4/00 |
| WO | 2003057791 | A1 | 7/2003 | |
| WO | 2003076485 | A2 | 9/2003 | |
| WO | 2003089536 | A2 | 10/2003 | |
| WO | 2005044867 | A1 | 5/2005 | |
| WO | 2010014545 | A1 | 2/2010 | |
| WO | 2012082448 | A1 | 6/2012 | |
| WO | 2015086778 | A1 | 6/2015 | |
| WO | 2018078273 | A1 | 5/2018 | |
| WO | 2018098302 | A1 | 5/2018 | |
| WO | 2018110705 | A1 | 6/2018 | |
| WO | 2022034521 | A1 | 2/2022 | |

* cited by examiner

COMPOSITION INCLUDING CYCLIC IMIDE-CONTAINING MONOMER AND ORGANOBORANE COMPLEX AND RELATED ARTICLES AND METHODS

CROSS-REFERENCE TO RELATED APPLICATION

This application is a national stage filing under 35 U.S.C. 371 of PCT/IB2022/055150, filed Jun. 2, 2022, which claims priority to U.S. Provisional Application No. 63/196,056, filed Jun. 2, 2021, the disclosure of which is incorporated by reference in its entirety herein.

BACKGROUND

Adhesives are known to be useful for bonding one substrate to another, e.g., a metal to a metal, a metal to a plastic, a plastic to a plastic, a glass to a glass. Structural adhesives are attractive alternatives to mechanical joining methods, such as riveting or spot welding, because structural adhesives distribute load stresses over larger areas rather than concentrating such stresses at a few points. Structural adhesives may also produce cleaner and quieter products because they can dampen vibration and reduce noise.

Low-surface-energy substrates (e.g., polyethylene, polypropylene and polytetrafluoroethylene) are some of the most difficult substrates to adhere together. The difficulties in adhesively bonding these materials are reported, for example, in "Adhesion Problems at Polymer Surfaces" by D. M. Brewis that appeared in Progress in Rubber and Plastic Technology, volume 1, page 1 (1985). To bond these materials, it can be necessary to use complex and costly surface preparation techniques such as flame treatment, corona discharge, plasma treatment, oxidation by ozone or oxidizing acids, and sputter etching. The complexity and cost of these approaches do not render them particularly suitable for use by the retail consumer (e.g., for repair of household items) or in low volume operations.

Some adhesives useful for bonding low-surface-energy substrates have been described in U.S. Pat. No. 5,616,796 (Pocius et al.), U.S. Pat. No. 5,621,143 (Pocius), U.S. Pat. No. 5,935,711 (Pocius et al.), U.S. Pat. No. 6,252,023 (Moren), U.S. Pat. No. 6,410,667 (Moren), U.S. Pat. No. 6,479,602 (Moren), U.S. Pat. No. 6,486,090 (Moren), U.S. Pat. No. 6,734,268 (Moren), U.S. Pat. No. 6,849,569 (Moren), and U.S. Pat. No. 7,371,466 (Kneafsey et al.), and U.S. Pat. Appl. Pub. Nos. 2016/0347975 (Irie) and 2018/0237660 (Irie).

SUMMARY

The present disclosure provides a composition useful, for example, as a sealant or adhesive, for example, a structural adhesive. In one aspect, the present disclosure provides a composition including a blend of monomers comprising at least one of a cyclic imide-containing acrylate or a cyclic imide-containing methacrylate and an organoborane complex. In some embodiments, the composition is packaged as a two-part composition, wherein a first part comprises the blend of monomers, and wherein a second part comprises the organoborane complex.

In another aspect, the present disclosure provides an article bonded with the composition, which is cured. The article comprises at least one low-surface-energy plastic.

In another aspect, the present disclosure provides a method of making a bonded article. The method includes applying the composition on at least one of the first substrate or the second substrate, adhering the first substrate and the second substrate using the adhesive composition, and allowing the adhesive composition to at least partially cure to make the bonded article. In embodiments in which the composition is packaged as a two-part composition, the method can include combining the first part and the second part to make the composition.

When bonding a low-surface-energy substrate, the composition of the present disclosure can provide greater adhesion to metals such as galvanized steel than comparable compositions that include the same blend of monomers as the composition of the present disclosure with the exception that it does not include the cyclic imide-containing acrylate or a cyclic imide-containing methacrylate. The beneficial adhesion is observed, in some embodiments, even when the substrates receive no surface treatment (e.g., corona, flame, abrasion) before bonding.

As used herein:

The terms "alkyl" and "alkenyl" refer to monovalent groups that are radicals of an alkane or alkene and include straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms, with alkenyl groups containing from 2 to 20 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms, and alkenyl groups contain 2 to 20 carbon atoms, 2 to 10 carbon atoms, 2 to 6 carbon atoms, 2 to 4 carbon atoms, or 2 to 3 carbon atoms. Cyclic groups can be monocyclic or polycyclic and typically have from 3 to 10 ring carbon atoms. Examples of "alkyl" groups include methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl.

The terms "alkylene" and "alkenylene" are the divalent or trivalent form of the "alkyl" and "alkenyl" groups defined above. The terms, "alkylenyl" and "alkenylenyl" are used when "alkylene" and "alkenylene", respectively, are substituted. For example, an arylalkylenyl group comprises an alkylene to which an aryl group is attached.

The term "aryl" refers to a monovalent group that is aromatic and, typically, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" is the divalent form of the "aryl" groups defined above.

The term "catenated" means an atom other than carbon (e.g., oxygen, nitrogen, or sulfur) that replaces one or more carbon atoms in a carbon chain (for example, so as to form a carbon-heteroatom-carbon chain or a carbon-heteroatom-heteroatom-carbon chain).

The term "interrupted", for example, with regard to an alkylene group refers to having part of the alkylene on both sides of the interrupting group such as an arylene or catenated oxygen atom. For example, $—CH_2CH_2—C_6H_5—CH_2—CH_2—$ is an example of an alkylene group interrupted by an arylene.

The term "acrylic" refers to both acrylic and methacrylic polymers, oligomers, and monomers.

The term "free-radically polymerizable" means free-radically homopolymerizable and/or free-radically copolymerizable (i.e., with a different monomer/oligomer).

The term "(meth)acryl" refers to acryl (also referred to in the art as acryloyl and acrylyl) and/or methacryl (also referred to in the art as methacryloyl and methacrylyl).

Terms such as "a", "an" and "the" are not intended to refer to only a singular entity but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "cure" and "curable" refer to forming polymer chains and/or joining polymer chains together by covalent chemical bonds, usually via crosslinking molecules or groups, to form a network polymer. Curing includes at least partial curing. A crosslinked polymer is generally characterized by insolubility but may be swellable in the presence of an appropriate solvent.

All numerical ranges are inclusive of their endpoints and non-integral values between the endpoints unless otherwise stated (e.g., 1 to 5 includes 1, 1.5, 2, 2.75, 3, 3.80, 4, 5, etc.).

Features and advantages of the present disclosure will be further understood upon consideration of the detailed description as well as the appended claims.

DETAILED DESCRIPTION

The composition of the present disclosure includes a blend of monomers comprising at least one of a cyclic imide-containing acrylate or a cyclic imide-containing methacrylate. The cyclic imide-containing acrylate or a cyclic imide-containing methacrylate comprises a ring system that includes one or more rings, in some embodiments, two rings. The ring system may include one or more saturated rings, unsaturated rings, aromatic rings, or a combination thereof. In some embodiments, the cyclic imide-containing acrylate or a cyclic imide-containing methacrylate is represented by formula:

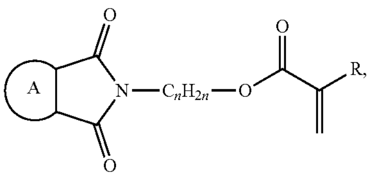

wherein A represents a saturated, unsaturated, or aromatic ring, n is an integer from 1 to 18, and R is hydrogen or methyl. In some embodiments, A represents a 5- to 8-membered ring. In some embodiments, A represents a 5- to 8-(in some embodiments, 5- to 7-) membered, saturated ring. In some embodiments, A represents a 6-membered, saturated ring. In some embodiments, n is an integer from 2 to 16, 2 to 12, 2 to 8, 2 to 6, or 2 to 4. In some embodiments, n is 2. In some embodiments, R is hydrogen. In some embodiments, R is methyl.

In some embodiments, the cyclic imide-containing acrylate or cyclic imide-containing methacrylate is

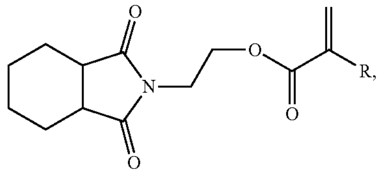

wherein R is hydrogen or methyl (that is, 2-(hexahydrophthalimido)ethyl acrylate or 2-(hexahydrophthalimido)ethyl methacrylate). In some embodiments, the cyclic imide-containing acrylate or cyclic imide-containing methacrylate is 2-(hexahydrophthalimido)ethyl methacrylate. 2-(Hexahydrophthalimido)ethyl methacrylate is commercially available, for example, from Miwon North America (Exton, Pa.) under the trade designation "MIRAMER M1089"). 2-(Hexahydrophthalimido)ethyl acrylate is commercially available, for example, from Miwon North America under the trade designation "MIRAMER M1088").

In some embodiments, the composition of the present disclosure includes at least 5 wt. %, at least 10 wt. %, or at least 15 wt. % of the cyclic imide-containing acrylate or the cyclic imide-containing methacrylate based on the total weight of the monomers in the composition. In some embodiments, the composition of the present disclosure includes up to 50 wt. %, 40 wt. %, 30 wt. %, or 25 wt. %, of the cyclic imide-containing acrylate or the cyclic imide-containing methacrylate based on the total weight of the monomers in the composition.

The blend of monomers in the composition of the present disclosure can also include other monofunctional free-radically polymerizable monomers, in some embodiments, acrylic monomers. Examples of useful monomers include 2-phenoxyethyl (meth)acrylate, benzyl (meth)acrylate, alkoxylated lauryl (meth)acrylate, alkoxylated phenol (meth)acrylate, alkoxylated tetrahydrofurfuryl (meth)acrylate, caprolactone (meth)acrylate, cyclic trimethylolpropane formal (meth)acrylate, ethylene glycol methyl ether (meth) acrylate, ethoxylated nonyl phenol (meth)acrylate, isodecyl (meth)acrylate, isooctyl (meth)acrylate, lauryl (meth)acrylate, octadecyl (meth)acrylate (stearyl (meth)acrylate), tetrahydrofurfuryl (meth)acrylate, tridecyl (meth)acrylate, tetrahydrofurfuryl (meth)acrylate, allyl (meth)acrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth) acrylate, 2-methoxyethyl (meth)acrylate, 2-ethoxyethyl (meth)acrylate, 2- or 3-ethoxypropyl (meth)acrylate, 2-(2-ethoxyethoxy)ethyl acrylate, glycidyl (meth)acrylate, an acrylic monomer comprising a cycloalkyl group having up to 14, 12, or 10 carbon atoms (e.g., isobornyl acrylate, isobornyl methacrylate, cyclohexyl acrylate, cyclohexyl methacrylate, t-butylcyclohexyl acrylate, or t-butylcyclohexyl methacrylate), an acrylic monomer comprising a carboxylic acid group (e.g., methacrylic acid, acrylic acid, methacrylic acid, itaconic acid, β-acryloyl oxyethyl hydrogen succinate and β-methacryloyl oxyethyl hydrogen succinate), an acrylic monomer comprising a hydroxyl group (e.g., 2-hydroxyethyl acrylate, 2-hydroxyethyl methacrylate, 2- and 3-hydroxypropyl acrylate, 2- and 3-hydroxypropyl methacrylate, hydroxybutyl acrylate, hydroxybutyl methacrylate, caprolactone mono(meth)acrylate and other poly (e-caprolactone) mono[2-(meth)acryloxy ethyl] esters, poly (e-caprolactone) mono[2-acryloxy ethyl] esters, 2-hydroxy- 3-alkyloxy methacrylate, 2-hydroxy-3-alkyloxy acrylate, polyethylene glycol mono acrylates and methacrylates), dibutyl itaconate, ethylene glycol methacrylate phosphate, vinyl phosphonic acid, N-(2-(2-oxo-1-imidazolidinyl)ethyl) methacrylamide, and methacrylamidoethyl ethylene urea ("MAEEU") available from Solvay Specialty Polymers USA, LLC as SIPOMER WAM II), and combinations thereof. Further useful monomers include a partial or complete ester of a polyhydric alcohol (e.g., ethylene glycol, diethylene glycol, polyethylene glycol, trimethylol propane, triethylene glycol, tetraethylene glycol, dipropylene glycol, tripropylene glycol, tetrapropylene glycol, pentapropylene glycol, polypropylene glycol, ethoxylated or propoxylated diphenylol propane) and (meth)acrylic acid; a (meth)acrylic acid ester of hydroxy-terminated polyurethane; or an aliphatic polyester urethane (meth)acrylate. Further useful monomers in the blend of monomers include vinyl acetate; vinyl chloride; vinyl fluoride; vinyl bromide; styrene; dibehenyl benzene; a crotonic acid ester; a maleic acid ester; a styrenated unsaturated polyester resin; N,N-dimethyl acrylamide; a nitrogen-containing polymerizable monomer such as N,N-diethyl acrylamide, N-t-butyl acrylamide, N-(acryloyl)morpholine, N-(acryloyl)piperidine. Any combination of these monomers may be useful.

In some embodiments, the blend of monomers comprises at least one of an acrylic ester of an alkanol having from 1 to 12 carbon atoms, a methacrylic ester of an alkanol having from 1 to 12 carbon atoms, tetrahydrofurfuryl acrylate, or tetrahydrofurfuryl methacrylate. Examples of suitable acrylic esters of an alkanol having from 1 to 12 carbon atoms include n-butyl acrylate, s-butyl acrylate, t-butyl acrylate, n-pentyl acrylate, isopentyl acrylate, hexyl acrylate, cyclohexyl acrylate, heptyl acrylate, isoamyl acrylate, 2-ethylhexyl acrylate, n-octyl acrylate, 2-octyl acrylate, isooctyl acrylate, n-nonyl acrylate, isononyl acrylate, n-decyl acrylate, isodecyl acrylate, n-dodecyl acrylate, isobornyl acrylate, 2-methylbutyl acrylate, 4-methyl-2-pentyl acrylate, and methacrylates of the foregoing acrylates. In some embodiments, the blend of monomers includes dibutyl itaconate.

Specific examples of other mono(meth)acrylate monomers useful in some embodiments of the composition of the present disclosure include isobornyl acrylate available from Sartomer as SR506, or from Evonik Performance Materials GmbH as VISIOMER IBOA, isobornyl methacrylate available from Sartomer as SR423A or from Evonik Performance Materials GmbH under the trade name VISIOMER IBOMA, cyclohexyl methacrylate (available from Evonik Performance Materials GmbH as VISIOMER c-HMA), dicyclopentanyl methacrylate (available from Hitachi Chemical as FANCRYL FA-513M), isobornyl cyclohexyl methacrylate (available from Designer Molecules, Inc., San Diego, California, as product MM-304), 4-t-butylcyclohexyl methacrylate (available from Miwon North America, Exton, Pennsylvania, as Miramer M1151), methacrylic acid available from Evonik Performance Materials GmbH as VISIOMER GMAA, β-methacryloyl oxyethyl hydrogen succinate available from Shin-Nakamura Co. Ltd., Arimoto, Japan, as NK ESTER SA, 2-hydroxyethyl methacrylate (available from Evonik Performance Materials GmbH as VISIOMER HEMA 97 and HEMA 98), hydroxypropyl methacrylate (available from Evonik Performance Materials GmbH as VISIOMER HPMA 97 and HPMA 98), ultra-high purity 2-hydroxyethyl methacrylate (available from Evonik Performance Materials GmbH as VISIOMER UHP HEMA), polypropylene glycol monomethacrylate (available from Miwon North America, Exton, Pennsylvania, as MIRAMER M1051), and $CH_2{=}CHC(O)O(CH_2CH_2O)_{7-9}H$ available, for example, from Nippon Oil & Fats Company, Tokyo, Japan under the trade designation "BLEMMER", caprolactone mono(meth)acrylate, available under the trade designation "SR-495B" from Sartomer, 2-phenoxyethyl methacrylate (available from SARTOMER as SR340), benzyl methacrylate (available from Miwon North America, Exton, Pennsylvania, as MIRAMER M1183), phenyl methacrylate (available from Miwon North America as MIRAMER M1041), allyl methacrylate (available from Evonik Performance Materials GmbH as VISIOMER AMA), methyl methacrylate (commercially available from Evonik Performance Materials GmbH under the trade designation VISIOMER MMA), n-butyl methacrylate (available from Evonik Performance Materials GmbH as VISIOMER n-BMA), isobutyl methacrylate (available from Evonik Performance Materials GmbH as VISIOMER i-BMA), glycerol formal methacrylate (available from Evonik Performance Materials GmbH as VISIOMER GLYFOMA), 2-(2-butoxyethoxy) ethyl methacrylate (available from Evonik Performance Materials GmbH as VISIOMER BDGMA), lauryl methacrylate available from BASF, Florham Park, N.J., as LMA 1214 F, 2-isocyanatoethyl methacrylate (available from Showa Denko K. K. (Tokyo, Japan) as KarenzMOI), 2-(methacryloyloxy)ethyl phthalate mono ((HEMA phthalate) available as product number X-821-2000 from ESSTECH, Inc., Essington, Pa.), 2-(methacroyloxy)ethyl maleate (HEMA maleate available as product number X-846-0000 from ESSTECH, Inc.), methoxy diethylene glycol methacrylate (available from Shin-Nakamura Co. Ltd. as M-20G, methoxy triethylene glycol methacrylate (available from Shin-Nakamura Co. Ltd. as M-30G, methoxy tetraethylene glycol methacrylate (available from Shin-Nakamura Co. Ltd. as M-40G, methoxy tripropylene glycol methacrylate (available from Shin-Nakamura Co. Ltd. as M-30PG, butoxy diethylene glycol methacrylate (available from Shin-Nakamura Co. Ltd. as B-20G), phenoxy ethylene glycol methacrylate (available from Shin-Nakamura Co. Ltd. as PHE-1G), phenoxy diethylene glycol methacrylate (available from Shin-Nakamura Co. Ltd. as PHE-2G), dicyclopentenyloxyethyl methacrylate (available from Hitachi Chemical, Tokyo, Japan, as FANCRYL FA-512M), 4-methacryloxyethyl trimellitic anhydride (available from Designer Molecules, Inc. as product A-304), 2-methacryloxyethyl phenyl urethane (available from Polysciences, Inc., Warrington, Pa.), trifluoroethyl methacrylate (available from Hampford Research Inc., Stratford, Conn.), methacrylamide (available from Evonik Performance Materials GmbH as VISIOMER MAAmide), 2-dimethylaminoethyl methacrylate (available from Evonik Performance Materials GmbH as VISIOMER MADAME), 3-dimethylaminopropyl methacrylamide (available from Evonik Performance Materials GmbH as VISIOMER DMAPMA), phosphonate-functional (meth)acrylate monomers (e.g., the SIPOMER PAM resins from Solvay Specialty Polymers USA, LLC or those from Miwon North America (Exton, Pennsylvania) as MIRAMER SC1400 and MIRAMER SC1400A), and combinations thereof.

The organoborane in the composition of the present disclosure initiates free-radical polymerization of the cyclic imide-containing acrylate or the cyclic imide-containing methacrylate and other monomers to form a polymer that can be useful as a bonding composition (e.g., an acrylic adhesive). The organoborane initiator may be represented by the following general formula:

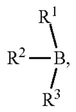

wherein $R^1$ is alkyl having from 1 to 10 carbon atoms, and $R^2$ and $R^3$ are each independently alkyl having from 1 to 10 carbon atoms or aryl. In some embodiments, $R^1$, $R^2$, and $R^3$ are each independently alkyl having from 1 to 5 carbon atoms. $R^1$, $R^2$, and $R^3$ may all be different, or more than one of $R^1$, $R^2$, and $R^3$ may be the same. Examples of suitable organoboranes include trimethylborane, triethylborane, tri-n-propylborane, triisopropylborane, tri-n-butylborane, tri-isobutylborane, and tri-sec-butylborane.

Organoborane initiators are typically complexed with a complexing agent. Examples of suitable complexing agents in the organoborane complex include amines, amidines, hydroxides, and alkoxides. Although the complexing agent can be monofunctional, in some embodiments, the complexing agent includes more than one complexing group (e.g., diamines and polyamines described below). The ratio of the boron atom to the complexing group in the complexing agent in the complex is generally at least 0.1:1, or at least 0.3:1, or at least 0.5:1, or at least 0.8:1, or at least 0.9:1 and, up to 2:1, or up to 1.5:1, or up to 1.2:1. In some embodiments, the ratio is in a range of 0.1:1 to 2:1, or in a range of 0.5:1 to 1.5:1, or in a range of 0.8:1 to 1.2:1, or in a range of 0.9:1 to 1.1:1, or 1:1.

In some embodiments, the complexing agent is an amine. Blends of different amines and blends of different organoborane amine complexes may also be used.

In some embodiments, the organoborane complex is represented by formula:

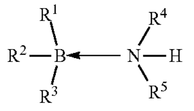

wherein

- $R^1$, $R^2$, and $R^3$ are as defined above in any of their embodiments; and
- $R^4$ and $R^5$ are each independently hydrogen, alkyl having from 1 to 10 carbon atoms (in some embodiments, 1 to 8 carbon atoms), arylalkylenyl, polyoxyalkylenyl, or alkyl, arylalkylenyl, or polyoxyalkylenyl terminated by a primary or secondary amino group or a primary or secondary amino group complexed to $R^1B(R^2)R^3$, or $R^4$ and $R^5$ together with the nitrogen atom to which they are attached join to form a 3- to 7-membered ring. The secondary amino group may be substituted with alkyl having from 1 to 10 carbon atoms (in some embodiments, 1 to 8 carbon atoms), arylalkylenyl, or polyoxyalkylenyl. In some embodiments, $R^4$ is hydrogen, and $R^5$ is hydrogen, alkyl having from 1 to 10 carbon atoms (in some embodiments, 1 to 8 or 1 to 4 carbon atoms) or arylalkylenyl. In some embodiments, $R^4$ and $R^5$ together with the nitrogen atom to which they are attached join to form a 3- to 7-membered ring. Suitable examples of monofunctional amines include ammonia, ethylamine, butylamine, hexylamine, octylamine, benzylamine, morpholine, aziridine, piperidine, pyrrolidine, and polyoxyalkylene monoamines (e.g., obtained under the trade designation "JEFFAMINE" from Huntsman Chemical Company, such as M715 and M2005).

In some embodiments, the amine complexing agent is a polyamine, and at least of $R^4$ or $R^5$ is alkyl, arylalkylenyl, or polyoxyalkylenyl terminated by a primary or secondary amino group. Suitable polyamines include diamines represented by formula: $R^5HN—R^6—NHR^5$, wherein $R^5$ is as defined above, and wherein $R^6$ is arylene or a linear or branched alkylene or alkylene interrupted with or terminated by arylene. Examples of suitable diamines include 1,2-ethanediamine, 1,3-propanediamine, 1,5-pentanediamine, 1,6-hexanediamine, 1,12-dodecanediamine, 2-methyl-1,5-pentanediamine, 3-methyl-1,5-pentanediamine, and isomers of these materials. Further examples of suitable polyamines include triamines and tetraamines (e.g., triethylene tetraamine and diethylene triamine).

Yet further suitable polyamines include polyoxyalkylenepolyamines such as those represented by formulas: $H_2NR^8—O—(R^9O)_w—R^8NH_2$ and $[H_2NR^8—O—(R^9O)_w]_z—R^{11}$. In these formulas, $R^8$ and $R^9$ are each independently alkylene groups having 1 to 10 carbon atoms. In some embodiments, $R^8$ is an alkylene group having 2 to 4 carbon atoms (e.g., ethylene, n-propylene, iso-propylene, n-butylene or iso-butylene). In some embodiments, each $R^9$ is independently an alkylene having 2 or 3 carbon atoms (e.g., ethylene, n-propylene, or iso-propylene). $R^{11}$ is a linear or branched alkylene or alkylene interrupted with or terminated by arylene, wherein the alkylene group is optionally interrupted by one or more catenated oxygen atoms. The value of w is at least 1, in some embodiments form 1 to about 150, or from 1 to about 20. The value of z is >2, in some embodiments 3 or 4 (so as to provide, respectively, polyoxyalkylene triamines and tetraamines). In some embodiments, the number average molecular weight of the polyoxyalkylenepolyamine, is up to about 5,000 or about 1,000 or in a range from about 140 to 1,000. In some embodiments, the polyoxyalkylenepolyamine and its complex with the organoborane are liquid at room temperature ("room temperature" refers to, herein, a temperature of about 20° C. to 25° C.).

Examples of suitable polyoxyalkylenepolyamines include polyethyleneoxidediamine, polypropyleneoxidediamine, polypropyleneoxidetriamine, diethyleneglycoldipropylamine, triethyleneglycoldipropylamine, polytetramethyleneoxidediamine, poly(ethyleneoxide-co-propyleneoxide)diamine, and poly(ethyleneoxide-co-propyleneoxide)triamine. Further examples of suitable polyoxyalkylenepolyamines include those commercially available from Huntsman Chemical Company under the trade designation "JEFFAMINE" such as the D, ED, and EDR series diamines (e.g., D-400, D-2000, D-5000, ED-600, ED-900, ED-2001, and EDR-148), and the T series triamines (e.g., T-403), as well as DCA-221 from Dixie Chemical Company.

As reported in U.S. Pat. No. 5,616,796 (Pocius et al.), a suitable polyamine also includes the condensation reaction product of diprimary amine-terminated material (i.e., the two terminal groups are primary amine) and one or more materials containing at least two groups reactive with primary amine.

In some embodiments, the complexing agent is a hydroxide or an alkoxide. In some embodiments, the hydroxide or alkoxide is represented by formula $(^{(-)}O—R^{15})_nM^{(m+)}$, wherein $R^{15}$ is independently selected from hydrogen or an organic group (e.g., alkyl or alkylene group); $M^{(m+)}$ represents a countercation (e.g., sodium, potassium, tetraalkylammonium, or combinations thereof); n is greater than zero; and m is greater than zero. Examples of suitable hydroxide and alkoxide complexing agents include sodium hydroxide, tetrabutylammonium hydroxide, sodium methoxide, and tetrabutylammonium methoxide. Further details regarding hydroxide and alkoxide complexing agents can be found, for example, in U.S. Pat. No. 6,486,090 (Moren).

In some embodiments, the complexing agent is an amidine. In some embodiments, the amidine complexing agent is represented by formula

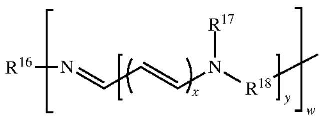

wherein: $R^{16}$ is hydrogen or an organic group (in some embodiments, an alkyl or alkylene group); $R^{17}$ and $R^{18}$ are independently a monovalent organic group or part of a cyclic structure; and w, x, and y are integers. In some embodiments, w is 1 and x is 0, 1, 2, or 3. Examples of suitable amidine complexing agents include N,N,N',N'-tetramethylguanidine; 1,8-diazabicyclo[5.4.0]undec-7-ene (DBU); 1,5-diazabicyclo[4.3.0]non-5-ene (DBN); 2-methylimidazole; 2-methylimidazoline; and 4-(N,N-dimethylamino)-pyridine. Further details about amidine complexing agents can be found, for example, in U.S. Pat. No. 6,410,667 (Moren).

An organoborane complex may be readily prepared using known techniques. Typically, the complexing agent is combined with the organoborane in an inert atmosphere (e.g., a glove box flushed with nitrogen to an environment having less than 100 ppm oxygen) with slow stirring. The organoborane can be added from a pressure equalizing dropping funnel to a flask into which the coupling agent has been previously weighed. An exotherm is often observed, and cooling of the mixture is, therefore, useful. Addition of the organoborane may be moderated to control the exotherm. If the ingredients have a high vapor pressure, it is desirable to keep the reaction temperature below about 70° C. to 80° C. The complex be kept in a capped vessel in a cool, dark location, if desired. In some embodiments, the organoborane complex can be formulated with a diluent or a blend of two or more different diluents.

The organoborane-amine complex may be readily prepared using known techniques, as described, for example, in U.S. Pat. No. 5,616,796 (Pocius et al.), 5,621,143 (Pocius), 6,252,023 (Moren), 6,410,667 (Moren), and 6,486,090 (Moren).

Some suitable organoborane-amine complexes are available from suppliers such as BASF and AkzoNobel. TEB-DAP (triethylborane-1,3-diaminopropane (or 1,3-propanediamine) complex), TnBB-MOPA (tri-n-butylborane-3-methoxypropylamine complex), TEB-DETA (triethylborane-diethylenetriamine complex), TnBB-DAP (tri-n-butylborane-1,3-diaminopropane complex), and TsBB-DAP (tri-sec-butylborane-1,3-diaminopropane complex) are all available from BASF (Ludwigshafen, Germany). TEB-HMDA (triethylborane-hexamethylenediamine (also 1,6-hexanediamine or 1,6-diaminohexane) complex) is available from AkzoNobel, Amsterdam, The Netherlands.

The amount of organoborane complex can be any amount effective to polymerize the blend of monomers including the cyclic imide-containing acrylate or the cyclic imide-containing methacrylate at a desirable rate. In some embodiments, the amount of the organoborane complex provides about 0.003 wt. % to 1.5 wt. % boron, about 0.008 wt. % to 0.5 wt. % boron, or about 0.01 wt. % to 0.3 wt. % boron. The wt. % of boron in a composition is based on the total weight of the composition, other than fillers, non-reactive diluents, and other non-reactive materials. Thus, the polymerizable monomers, the vinyl aromatic compound, and organic thickener, (e.g., poly(methyl methacrylate) or core-shell polymer), if present, are included, but ingredients lacking abstractable hydrogen atoms or unsaturation are not. The wt. % of boron in the composition can be calculated by the following equation:

$$\frac{\text{weight organoborane in the composition } X \text{ wt. \% of boron in organoborane}}{\text{total weight of reactive components in the composition.}}$$

In some embodiments, the composition of the present disclosure comprises a salt of a positively charged metal capable of having at least two oxidation states. The metal salt may be useful, for example, for modifying the cure kinetics of the composition to provide a desirable balance of long adhesive worklife and fast rate of strength build. The metal salt may have any positive charge ranging from 1 to 6 and any appropriate counterion or counterions to balance the positive charge and may have one or more covalently bonded ligands. Chemically accessible oxidation states of various metals can be found, for example, in “Chemistry of the Elements” by N. N. Greenwood and A. Earnshaw, Pergamon Press, 1984, at pages 24 to 37. In some embodiments, the metal cation useful in the metal salt has at least two chemically accessible oxidation states separated by a difference in charge of 1. The metal salts may include the lower oxidation state or the higher oxidation state of the metal. Examples of suitable metal cations include transition metal cations (including lanthanide and actinide metal cations) having at least two chemically accessible oxidation states. The metal salt can be selected such that it is soluble in the composition or at least partially dissolves in the composition during use.

Examples of metal cations in the metal salt include vanadium, chromium, manganese, iron, cobalt, nickel, copper, molybdenum, ruthenium, rhodium, palladium, antimony, platinum, and cerium cations. In some embodiments, the metal cation in the metal salt is a vanadium, chromium, manganese, iron, cobalt, nickel, copper, ruthenium, palladium, or antimony cation. In some embodiments, the metal cation in the metal salt is a manganese, iron, cobalt, or copper metal cation. In some embodiments, the metal salt is a copper salt or iron salt.

In some embodiments, the metal salts useful in the composition comprise at least one counterion having a charge in a range from 1 to 3. Examples of suitable counterions include halides, borates, sulfonates, and carboxylates. In some embodiments, the anion in the metal salt is chloride, bromide, tetrafluoroborate, trifluoromethanesulfonate, naphthenate, or 2-ethylhexanoate.

In some embodiments, the metal salts useful in the composition include one or more ligands covalently bonded to the metal. The number of ligands can range from 0 to 10. These ligands include traditional coordination compound ligands such as water, ammonia and amines as well as ligands such as carbonyl (carbon monoxide), isonitriles, phosphines, phophites, arsines, nitrosyl (nitric oxide), and pi electron donating ligands such as ethylene and other alkenes.

In some embodiments, the metal salt comprises at least one of copper (II) bromide, copper (II) chloride, copper (II) 2-ethylhexanoate, iron (III) bromide, vanadium (III) bromide, chromium (III) bromide, ruthenium (III) bromide, copper (II) tetrafluoroborate, copper (II) trifluoromethanesulfonate, copper (II) naphthenate, copper (I) bromide, iron (II) bromide, manganese (II) bromide, cobalt (II) bromide, nickel (II) bromide, antimony (III) bromide, and palladium (II) bromide.

The metal salt can be present in the composition in any suitable amount. A generally effective amount of metal salt is up to about 40,000 parts per million (ppm), from about 60 ppm to about 20,000 ppm, or from about 100 ppm to about 4,000 ppm based on the total weight of the composition.

In some embodiments of the composition of the present disclosure, the composition further comprises a decomplexing agent for the organoborane complex. The term "decomplexing agent" as used herein refers to a compound capable of liberating the initiator (e.g., organoborane) from its complexing agent, thereby enabling initiation of the polymerizable monomers of the composition. Decomplexing agents may also be referred to as "activators" or "liberators", and these terms may be used synonymously herein.

When the organoborane is complexed with an amine, a suitable decomplexing agent is an amine-reactive compound. An amine-reactive compound liberates organoborane by reacting with the amine, thereby removing the organoborane from chemical attachment with the amine. Some amine-reactive compounds useful as decomplexing agents readily form reaction products with amines at or below room temperature so as to provide a composition that can be easily cured under ambient conditions. In some embodiments, the decomplexing agent comprises at least one of an acid, an ester, an anhydride, an aldehyde, a β-ketone, an isocyanate (e.g., isophorone diisocyanate and toluene diisocyanate), an acid chloride (e.g., methacryloyl chloride), or a sulfonyl chloride.

Any acid that can liberate the organoborane by reacting with the amine group may be employed. Useful acids include Lewis acids (e.g., $SnCl_4$ and $TiCl_4$) and Bronsted acids (e.g., carboxylic acids, HCl, $H_2SO_4$, $H_3PO_4$, phosphonic acid, phosphinic acid, and silicic acid). Useful carboxylic acids include those having the general formula $R^{20}$—COOH, wherein $R^{20}$ is hydrogen, an alkyl group having 1 to 30, 1 to 8, 9 to 30, 15 to 30, or 1 to 4 carbon atoms, an alkenyl group having 2 to 30, 2 to 8, 9 to 30, 15 to 30, or 2 to 4 carbon atoms, or an aryl group having 6 to 10 or 6 to 8 carbon atoms. The alkyl and alkenyl groups may comprise a straight chain, or they may be branched. The aryl groups may be unsubstituted or have up to four substituents such as alkyl, alkoxy, and halogen. Examples of suitable carboxylic acids include acrylic acid, methacrylic acid, acetic acid, benzoic acid, and p-methoxybenzoic acid.

Other useful decomplexing agents for organoborane-amine complexes include multi-functional carboxylic acids and multi-functional carboxylic acid esters, which may be saturated, unsaturated, aromatic, or a combination thereof and can include up to 30, 20, 12, or 10 carbon atoms. The carbon chains may be straight-chain or branched and may be interrupted by one or more catenated oxygen, nitrogen, or sulfur atoms. Suitable multi-functional carboxylic acids and multi-functional carboxylic acid esters can be difunctional, trifunctional, tetrafunctional, or have a higher level of functionality. Examples of useful dicarboxylic acids include oxalic acid, malonic acid, succinic acid, glutaric acid, adipic acid, maleic acid, fumaric acid, phthalic acid, hexahydrophthalic acid, isophthalic acid, and terephthalic acid. Examples of useful multifunctional carboxylic acid esters include 1,2-ethylene bismaleate, 1,2-propylene bismaleate, 2,2'-diethyleneglycol bismaleate, 2,2'-dipropyleneglycol bismaleate, and trimethylolpropane trismaleate.

Other useful decomplexing agents for organoborane-amine complexes include carboxylic acid anhydrides. Useful carboxylic acid anhydrides also include the cyclic anhydrides of the dicarboxylic acids described above that are capable of forming 5- to 6-membered rings. Examples of these cyclic anhydrides include succinic anhydride, glutaric anhydride, maleic anhydride, phthalic anhydride, hexahydrophthalic anhydride. Other useful carboxylic acid anhydrides include those represented by formula $R^{24}$—C(O)—O—C(O)—$R^{25}$, wherein $R^{24}$ and $R^{25}$ are independently alkyl, alkenyl, or aryl, wherein alkyl and alkenyl may be straight-chain, branched, or cyclic and may include up to 18 carbon atoms. In some embodiments, $R^{24}$ and $R^{25}$ include 1 to 9 carbon atoms (e.g., acetic anhydride and propionic anhydride). Aryl groups (e.g., phenyl) may be unsubstituted or have up to four substituents such as alkyl, alkoxy, and halogen.

Other useful decomplexing agents for organoborane-amine complexes include aldehydes, which may be saturated, unsaturated, aromatic, or a combination thereof and can include up to 30, 20, 12, or 10 carbon atoms. In some embodiments, the aldehyde is represented by formula $R^{27}$—$(CHO)_x$, wherein $R^{27}$ is alkyl, haloalkyl, hydroxyalkyl, or alkoxyalkyl, each of which can include 1 to 10 or 1 to 4 carbon atoms and may be straight-chained or branched, or aryl having 6 to 10 or 6 to 8 carbon atoms, and x is 1 or 2. The aryl groups may be unsubstituted or may be substituted by up to four substituents such as halogen, hydroxy, alkoxy, alkyl and nitro. Examples of useful aldehyde decomplexing agents include benzaldehyde, o-, m- and p-nitrobenzaldehyde, 2,4-dichlorobenzaldehyde, p-tolylaldehyde, and 3-methoxy-4 hydroxybenzaldehyde. Blocked aldehydes such as acetals may also be useful decomplexing agents.

Other useful decomplexing agents for organoborane-amine complexes include beta-ketone compounds, in which an electron-withdrawing group is in a beta-position relative to a ketone. The beta-ketone may be saturated, unsaturated, aromatic, or a combination thereof and can include up to 30, 20, 12, or 10 carbon atoms. The carbon chains may be straight-chain or branched and may be interrupted by one or more catenated oxygen, nitrogen, or sulfur atoms. Suitable electron-withdrawing groups include —$O_2C$—, —(CO)—, —HN(CO)—, —N(alkyl)(CO)—, $H_2N$(CO)—, and N≡C—. In some embodiments, the beta-ketone compound is a 1,3-dicarbonyl compound. Examples of suitable beta-ketone decomplexing agents include methyl acetoacetate, ethyl acetoacetate, t-butyl acetoacetate, 2-methacryloyloxyethyl acetoacetate, diethylene glycol bis(acetoacetate), polycaprolactone tris(acetoacetate), polypropylene glycol bis (acetoacetate), poly(styrene-co-allyl acetoacetate), N,N-dimethylacetoacetamide, N-methylacetoacetamide, acetoacetanilide, ethylene bis(acetoacetamide), polypropylene glycol bis(acetoacetamide), acetoacetamide, and acetoacetonitrile. Further examples of beta-ketone decomplexing agents can be found, for example, in U.S. Pat. No. 6,849,569 (Moren).

The decomplexing agent can be included in the composition in any effective amount (e.g., an amount effective to promote polymerization by liberating the initiator from its complexing agent, but without materially adversely affecting desired properties of the ultimate polymerized composition). In some embodiments, the decomplexing agent is provided in an amount such that the ratio of amine-, amidine-, hydroxide- or alkoxide-reactive groups in the decomplexing agent to amine, amidine, hydroxide or alkoxide groups in the organoborane complex is in the range of 0.5:1.0 to 10.0:1.0, 0.5:1.0 to 4.0:1.0, or about 1.0:1.0.

Free-radical inhibitors, such as hydroquinone monomethyl ether and tris (N-nitroso-N-phenylhydroxylamine) aluminum salt may be included in the composition of the present disclosure, for example, to prevent or reduce polymerization of the polymerizable monomers during storage. Inhibitors may be added in an amount that does not materially affect the rate of polymerization or the ultimate properties of polymers made therewith. Inhibitors are generally useful in amounts from about 100 ppm to 10,000 ppm based on the total weight of the blend of monomers in the composition.

The composition of the present disclosure may be provided as a one-part or two-part composition, for example, depending on the organoborane complex chosen as well as the identity and amount of optional additional components such as the decomplexing agent and the metal salt. In some embodiments, the composition of the present disclosure is packaged as a two-part composition, in which a first part comprises the blend of monomers, and a second part comprises the organoborane complex. At least one of the first part or the second part may include a decomplexing agent, a salt of a positively charged metal capable of having at least two oxidation states, a toughening agent, filler, reactive diluent, plasticizer, or a free-radical inhibitor as described herein in any of their embodiments. In some embodiments, the first part further comprises a decomplexing agent for the organoborane complex. In some embodiments, the first part further comprises a free-radical inhibitor. In some embodiments, the first part further comprises a salt of a positively charged metal capable of having at least two oxidation states. The second part may be in the form of a paste, for example, that includes a plasticizer or reactive diluent and optionally at least one of tougheners, dyes, pigments, tackifiers, or fillers as described herein in any of their embodiments. Some pastes of organoborane complexes, for example, are commercially available. An example of a useful second part is an accelerator obtained under the trade designation "3M SCOTCH-WELD DP8010NS", from 3M Company, St. Paul, Minn.

The identity and amount of the organoborane complex chosen as well as the identity and amount of optional additional components such as the decomplexing agent and the metal salt can affect the worklife of the composition. The worklife refers to the time between the mixing of the composition and the time after which the composition has reduced capacity to form strong adhesive bonds. The Worklife Test Method described in U.S. Pat. No. 6,734,268 (Moren) may be useful for determining worklife. In some embodiments, the worklife of the composition is at least about five, ten, or twenty minutes or more.

In some embodiments, the composition of the present disclosure or at least one of the first part or the second part of the two-part composition of the present disclosure includes a thickener. Thickeners may be employed to increase the viscosity of the composition of the present disclosure to an easily applied, viscous syrup-like consistency. Thickeners useful in the composition of the present disclosure include medium (e.g., about 40,000 to 200,000 grams/mole) molecular weight poly(butyl methacrylate) or copolymer of butyl methacrylate. In some embodiments, the thickener is a copolymer of butyl methacrylate and methyl methacrylate. The thickener, if present, may be incorporated into the composition (in some embodiments, at least one of the first part or the second part) in any useful amount. In some embodiments, the thickener is present in an amount of up to about 50 wt. %, 40 wt. %, 30 wt. %, 25 wt. %, 20 wt. %, 15 wt. %, 10 wt. %, 5 wt. %, based on the total weight of the blend of monomers.

In some embodiments, the composition of the present disclosure or at least one of the first part or the second part of the two-part composition of the present disclosure includes a reactive diluent. Suitable reactive diluents include 1,4-dioxo-2-butene functional compounds as reported in U.S. Pat. No. 6,252,023 (Moren).

In some embodiments, the composition of the present disclosure or at least one of the first part or the second part of the two-part composition of the present disclosure includes an aziridine compound. Useful aziridine-functional compounds as reported in U.S. Pat. No. 5,935,711 (Pocius et al.). In some embodiments, the second part of the composition includes an aziridine compound to dissolve or dilute the organoborane complex, which can help provide two-part adhesives that can be combined in a commercially useful mix ratio. In some embodiments, the diluent is not reactive with the organoborane or the organoborane complex and functions as an extender of the organoborane or the organoborane complex. In some embodiments, the decomplexing agent can also react with the aziridine compound.

The aziridine compound useful as a diluent has at least one aziridine ring or group where a carbon or nitrogen atom thereof may be optionally substituted by alkyl, aryl, alkylcarbonyl, arylcarbonyl, cyanoalkyl, or alkylene optionally interrupted or terminated by arylene. In some embodiments, the carbon or nitrogen atom is substituted by a short-chain alkyl group (e.g., a $C_{1-4}$ alkyl such as methyl, ethyl, or propyl). Examples of suitable mono-functional aziridines include N-ethyl aziridine, N-(2-cyanoethyl)aziridine, N-butyl aziridine, iso-butyl aziridine, 2-aziridinyl ethanol, 1-aziridinyl ethanol, 1-iso-butyryl aziridine, and 1-butyryl aziridine.

In some embodiments, the aziridine compound is a polyaziridine (i.e., having more than aziridine group). In polyaziridines, the aziridine rings may be substituted by any of the substituents described above and may be connected to each other by any alkylene, arylene, alkylene optionally interrupted or terminated by arylene, any of which may be interrupted with functional groups such as ethers, esters, sulfides, and phosphine oxides. The polyaziridine may have a molecular weight of at least 300 grams per mole. Suitable polyaziridines include the reaction product of aziridine or methylaziridine with trimethylol propane triacrylate or pentaerythritol triacrylate [e.g., trimethylolpropane tris-(2-methyl-1-aziridinepropionate), trimethylolpropane tris-(aziridinyl propionate), tetramethylolmethane tris (aziridinylpropionate), and pentaerythritol tris[3-(1-aziridinyl)propionate)]. Further examples of useful trifunctional aziridines include tris-(2-methyl-1-aziridinyl) phosphine oxide), tris-(1-aziridinyl) phosphine sulfide, tris-(1-aziridinyl) phosphine oxide, N,N'-toluene-2,4-bis(1-aziridinecarboxamide), N,N-hexamethylene-1,6-bis(1-aziridinecarboxamide), N,N'-hexamethylene-bis-1,6-bis-(2-methyl-1-aziridinecarboxamide), 1,6-hexanediol bis-(aziridinyl propionate), and 1,6-hexanediol bis-(2-methyl aziridinyl propionate). Examples of useful, commercially available polyaziridines include CX-100 (from DSM NeoResins, Inc.), XAMA-7 (from EIT, Inc.), and MAPO (tris [1-(2-methyl)aziridinyl]phosphine oxide (from Aceto Corp).

The aziridine compound is used in an effective amount, which may depend, for example, on whether reaction of the aziridine compound with the decomplexing agent is desirable. In some embodiments, the aziridine compound is present in up to about 50%, 25%, or 10%, based on the total weight of the composition or at least one of the first part or the second part, for example, the second part of the two-part composition.

The aziridine compound is typically a liquid at or near room temperature (e.g., in a range from about 10° C. to 32° C.) or forms a liquid solution with the organoborane complex at or near room temperature. In some embodiments, substantial amounts (e.g., at least about 50 wt. %, 75 wt. % or 100 wt. %)) of the organoborane complex may be dissolved in the aziridine compound.

In some embodiments, the composition of the present disclosure or at least one of the first part or the second part of the two-part composition of the present disclosure includes a vinyl aromatic compound, for example, vinyl aromatic compounds of the type reported in U.S. Pat. No. 6,479,602 (Moren). One example of a useful vinyl aromatic compound is an α-methylstyrene-group-containing oligomer prepared by reacting 3-isopropenyl-α,α-dimethylbenzyl isocyanate (obtainable as product name "TMI" from Cytec Industries, Inc., Woodland Park, NJ) with a monofunctional or multifunctional reactive hydrogen compound (e.g., at least one of a monofunctional or multifunctional amine or alcohol). Suitable monfunctional and multifunctional amines include any of those described above in connection with the organoborane amine complex. Suitable alcohol-containing compounds include polypropylene glycol, polycaprolactone triol, and diethylene glycol. The vinyl aromatic compound can be added in an amount of at least 1 wt. %, 2 wt. %, or 5 wt. % and/or up to about 65 wt. %, 60 wt. %, 50 wt. %, 40 wt. %, 30 wt. %, 20 wt. %, or 10 wt. %, based on the total weight of the composition or based on the total weight of at least one of the first part or the second part of the two-part composition. In some embodiments, the second part of the two-part composition includes a vinyl aromatic compound described above in any of its embodiments.

The composition of the present disclosure or at least one of the first part or the second part of the two-part composition of the present disclosure may include other components useful, for example, for adhesive compositions. For example, the composition or at least one of the first part or second part of the two-part composition can include at least one of toughening agents (e.g., acrylic core/shell polymers; styrene-butadiene/methacrylate core/shell polymers; acrylonitrile-butadiene rubber), plasticizers (e.g., aliphatic and aromatic hydrocarbons, alkyl esters, alkyl ethers, aryl esters, and aryl ethers), tackifiers, corrosion inhibitors, UV stabilizers, antioxidants, flame retardants, thixotropic agents such as fumed silica, dyes, pigments (e.g., ferric oxide, brick dust, carbon black, and titanium oxide), reinforcing agents (e.g., silica, magnesium sulfate, calcium sulfate, and beryllium aluminum silicate), clays such as bentonite, other suitable filler (e.g., glass beads, talc, and calcium metasilicate), dispersing agents, wetting agents, adhesion promoters (e.g., silane coupling agents), antistatic agents, thermally and/or electrically conductive particles, foaming agents, and hollow polymeric or ceramic microspheres (e.g., glass bubbles).

In some embodiments, the composition of the present disclosure or at least one of the first part or the second part of the two-part composition of the present disclosure includes a filler. Further examples of fillers useful for some embodiments of the composition of the present disclosure include at least one of a micro-fibrillated polyethylene, a fumed silica, a talc, a wollastonite, an aluminosilicate clay (e.g., halloysite), phlogopite mica, calcium carbonate, kaolin clay, metal oxides (e.g., silica, barium oxide, calcium oxide, magnesium oxide, zirconium oxide, titanium oxide, zinc oxide), nanoparticle fillers (e.g., nanosilica, nanozirconia), carbon black, hollow glass/ceramic beads, solid glass/ceramic spheres, antistatic compounds, and chalk. Particulates such as any of these fillers, pigments, conductive particles, clays, and thixotropic agents may be present in the composition in any desired amount. The composition may also be free of such particulates or include up to 0.01 wt. %, 0.1 wt. %, 0.5 wt. %, or one wt. %, based on the total weight of the composition. In some embodiments, the composition of the present disclosure includes at least one wt. % and/or up to 20 wt. %, 15 wt. %, 10 wt. %, or 5 wt. % of such particulates, alone or in combination, based on the total weight of the composition or at least one of the first part or the second part of the two-part composition.

In some embodiments, the composition of the present disclosure includes an elastomeric material (i.e., toughening agent). These materials can improve the fracture toughness of bonding compositions made therewith, which can be beneficial when, for example, bonding stiff, high yield strength materials (e.g., metal substrates that do not mechanically absorb energy as easily as other materials, such as flexible polymeric substrates). An example of a toughening agent are core-shell polymers having a polymerized diene rubbery backbone or core to which is grafted a shell of an acrylic acid ester or methacrylic acid ester, monovinyl aromatic hydrocarbon, or a mixture thereof, such as those disclosed in U.S. Pat. No. 3,496,250 (Czerwinski). Rubbery backbones can comprise polymerized butadiene or a polymerized mixture of butadiene and styrene. Shells comprising polymerized methacrylic acid esters can be lower alkyl ($C_{1-4}$) methacrylates. Monovinyl aromatic hydrocarbons can be styrene, alpha-methylstyrene, vinyltoluene, vinylxylene, ethylvinylbenzene, isopropylstyrene, chlorostyrene, dichlorostyrene, and ethylchlorostyrene.

Core-shell polymers (e.g., acrylic core/shell polymers and styrene-butadiene/methacrylate core/shell polymers), which are useful toughening agents, can also be added to modify spreading and flow properties of the composition. For example, the addition of a core-shell polymer to the composition may help reduce the tendency for the composition to leave an undesirable "string" upon dispensing from a syringe-type applicator and/or may help reduce the tendency for the composition to sag or slump after having been applied to a vertical surface. In some embodiments, a core-shell polymer or other elastomeric material (e.g., acrylonitrile-butadiene rubber) may be included in the composition of the present disclosure or at least one of the first part or the second part of the two-part composition of the present disclosure in an amount of at least 5 wt. %, 10 wt. %, 15 wt. %, or 20 wt. % and up to 40 wt. %, 35 wt. %, 30 wt. %, or 25 wt. %, based on total weight of the composition or at least one of the first part or the second part of the two-part composition. The composition may also be free of such toughening agents or include them in up to 0.01 wt. %, 0.1 wt. %, 0.5 wt. %, or one wt. %, based on the total weight of the composition or at least one of the first part or the second part of the two-part composition.

In some embodiments in which the composition of the present disclosure is packaged as a two-part composition, the first part and the second part can be combined at any suitable volume ratio. For example, the first part and the second part can be combined at a volume ratio in a range of from about 5:100 to about 100:1, about 10:100 to about 50:1, or about 1:1 to 20:1. For ease of use with readily available dispensing equipment, the two parts of the composition can be made to be capable of being combined in a common, whole number mix ratio such as 10:1, 4:1, 3:1, 2:1, or 1:1.

In some embodiments, the second part of the two-part composition is a solution of a 2:1 mole ratio complex of triethyl borane and a diamine such as 1,6-hexamethylene diamine in a polyaziridine liquid, for example, triemethylol propane tris(3-methylaziridine)propionate, combined with a vinyl aromatic compound described above, fumed silica, and carbon black. The vinyl aromatic compound can be an adduct of 2:1 3-isopropenyl-α,α-dimethylbenzyl isocyanate and a diamine-terminated polypropylene glycol obtained from Huntsman Petrochemical Corp. under the trade designation "JEFFAMINE D2000". The second part of the two-part composition can include, for example, about 12 grams of a 2:1 mole ratio complex of triethyl borane and 1,6-hexamethylene diamine, about 22 grams of "CX-100" from DSM NeoResins, Inc., about 62 grams of an adduct of 2:1 3-isopropenyl-α,α-dimethylbenzyl isocyanate and a diamine-terminated polypropylene glycol obtained from Huntsman Petrochemical Corp. under the trade designation "JEFFAMINE D2000", about 4 grams of "CAB-O-SIL TS-720" fumed silica, and 0.2 gram of carbon black. The second part can be prepared as described, for example, in U.S. Pat. Appl. Pub. No. 2016/0347975 (Irie), paragraphs [0075] and [0076].

When the composition of the present disclosure is packaged as a two-part composition, the first part and the second part can be located in any suitable system or kit for containing, mixing, and dispensing the first part and the second part. The system can be suited for large-scale industrial applications or small-scale applications. Either system can include first and second chambers for holding the respective first part and second part. The chambers can be sized for any application and formed from plastic, metal, or any other suitable material. A dispenser can be adapted to receive the first part and the second part and dispense a mixture of the first part and the second part on a substrate. The dispenser can function to facilitate mixing of the first part and the second part, or a mixing chamber can be disposed upstream of the dispenser and in fluid communication with the first chamber and the second chamber. The mixing chamber can be adapted to rotate in order to facilitate mixing, or the mixing chamber can include a number of baffles to induce rotation of the first part and the second part.

To facilitate movement of the first part and the second part, the system can include elements such as one or more plunger or one or more pumps. The one or more plungers can be useful for systems that are handheld. In these embodiments, a user can push one or two plungers, between at least a first and a second position, to force the first part and the second part through the system. If there is one plunger, then the first part and the second part can be dispensed at equal volumes or at a predetermined volume ratio.

Pumps can be useful in industrial applications where large volumes or a continuous supply of the first part and the second part are dispensed. These systems can include one or more pumps that are in fluid communication with the first and second chambers. The one or more pumps can be located downstream of the first and second chambers but upstream of the mixing chamber. In embodiments of the system in which there are two pumps in fluid communication with respective first and second chambers, the pumps can be adapted or controlled to pump an equal volume of the first part and the second part or to pump different quantities of each part according to a predetermined volume ratio.

Some useful dispensers are described in U.S. Pat. No. 4,538,920 (Drake) and 5,082,147 (Jacobs), and some are available from ConProTec, Inc. (Salem N.H.) under the tradename "MIXPAC".

The composition of the present disclosure may be at least partially cured by exposure to thermal energy (e.g., in an oven, infrared radiation, or thermal conduction), by exposure to oxygen, by combining two-parts of a two part composition, or any combination of the foregoing.

After at least partial curing, a crosslinked composition is generally obtained, and if sufficiently cured it may be suitable for use as a structural adhesive to bond two adherends. In such use, the composition is typically sandwiched between the adherends and at least partially cured; for example, for a time sufficient to achieve at least a desired level of bond strength.

Compositions of the present disclosure may be used, for example, to bond a first substrate to a second substrate to provide a bonded article. Many types of substrates may be bonded with compositions of the present disclosure such as metal (e.g., galvanized steel, stainless steel, or aluminum), glass (e.g., which may be coated with indium tin oxide), a polymer (e.g., a plastic, rubber, thermoplastic elastomer, or thermoset), or a composite. A composite material may be made from any two or more constituent materials with different physical or chemical properties. When the constituents are combined to make a composite, a material having characteristics different from the individual components is typically achieved. Some examples of useful composites include fiber-reinforced polymers (e.g., carbon fiber reinforced epoxies and glass-reinforced plastic), metal matrix compositions, and ceramic matrix composites. Useful polymeric substrates that can be bonded include polymers such as polyolefins (polypropylene, polyethylene, high density polyethylene, blends of polypropylene), fluoropolymers, polyamide 6 (PA6), polyamide 6,6, acrylonitrile butadiene styrene (ABS), polycarbonate (PC), PC/ABS blends, polyvinyl chloride (PVC), polyamide (PA), polyurethane (PUR), thermoplastic elastomers (TPE), polyolefin elastomers (e.g., ethylene-propylene rubber, ethylene-propylene-diene rubber), fluoropolymer elastomers, polyoxymethylene (POM), polystyrene, poly(methyl) methacrylate (PMMA), polyvinyl chloride (PVC), polyetheretherketone (PEEK), and combinations thereof. The substrate may also include a metal coating on such polymers.

In some embodiments of the article bonded with the composition and the methods of making a bonded article, the article (in some embodiments, at least one of the first substrate or the second substrate) comprises a low-surface-energy plastic. Low-surface-energy plastics are typically those that have a surface energy of less than 45 millijoules per square meter ($mJ/m^2$), more typically less than 40 $mJ/m^2$ or less than 35 $mJ/m^2$. Included among such materials are polyvinyl chloride, polymethylmethacrylate, polyethylene, polypropylene, acrylonitrile-butadiene-styrene, and fluorinated polymers such as polytetrafluoroethylene. Polyethylene, polypropylene, and fluoropolymers have surface energies less than 35 $mJ/m^2$, and some fluoropolymers such as polytetrafluoroethylene have a surface energy of less than 20 $mJ/m^2$. The low-surface-energy plastic in the article of the present disclosure can be part of a composite material such as a fiber-reinforced plastic or a glass-reinforced plastic.

The present disclosure provides an article bonded with the composition disclosed herein in any of its embodiments, wherein the composition is cured, and wherein the article comprises at least one low-surface-energy plastic. In some embodiments, the article further comprises at least one of a metal or glass. In some embodiments, the article further comprises another plastic, which is not necessarily a low-surface-energy plastic.

The present disclosure provides a method of making a bonded article comprising a first substrate and a second substrate. The method includes applying the composition of present disclosure on at least one of the first substrate or the second substrate, adhering the first substrate and the second substrate using the composition, and allowing the composition to at least partially cure to make the bonded article. In some embodiments, the method includes combining the first part and the second part of the two-part composition to provide an adhesive composition, applying the adhesive composition to at least a portion of one surface of the first substrate, adhering the first substrate and the second substrate using the adhesive composition, and allowing the adhesive composition to at least partially cure to make the bonded article. In some embodiments, at least one of the first substrate or second substrate comprises at least one low-surface-energy plastic. In some embodiments, the first substrate or second substrate further comprises at least one of a metal or glass. In some embodiments, the first substrate or second substrate further comprises another plastic, which is not necessarily a low-surface-energy plastic. In some embodiments, the method is carried out without subjecting the low-surface-energy plastic to flame treatment, corona discharge, plasma treatment, oxidation by ozone or oxidizing acids, sputter etching, primer treatment, or any combination thereof.

When the first part and the second part are combined, the composition is desirably used to bond the first substrate and the second substrate during the worklife of the composition, as described above. While it is not practical to enumerate a particular curing temperature suitable for all situations, generally suitable temperatures are in a range from about 23° C. to about 200° C. In some embodiments, advantageously, the composition can be cured at room temperature (e.g., 23° C. to 30° C., or below 40° C.), in at least 5 minutes, 10 minutes, 20 minutes, 30 minutes, or 45 minutes, for example. In some embodiments, advantageously, the composition can be cured at room temperature (e.g., 23° C. to 30° C., or below 40° C.), within up to 60 minutes, 90 minutes, 120 minutes, 6 hours, 12 hours, 24 hours, 48 hours, or 72 hours for example. Full strength will normally be reached in less than 24 hours under ambient conditions. Post-curing at an elevated temperature may also be used if desired.

The first and second substrates can be joined together with pressure to force excess composition out of the bond line. This may be advantageous for displacing composition that has been exposed to air and that may have advanced too far in cure. The typical bond line thickness is about 0.1 to 0.3 mm but may exceed 1.0 mm when gap filling is needed.

The composition of the present disclosure can be useful, for example, for bonding electronic articles and automotive (e.g., electronic vehicles) and aerospace components.

As shown in the Examples, below, some compositions (e.g., Comparative Examples A and B) known to provide good adhesion to low-surface-energy plastics can have less desirable adhesion to metals. In a direct comparison between Example 2, which is a bonded article made by a composition of the present disclosure, and Comparative Example A2, which is a bonded article made by a composition that is the same as the composition of the present disclosure except that it contains no cyclic imide-containing acrylate or a cyclic imide-containing methacrylate, at least a 40 percent improvement in overlap shear was observed with the addition of the cyclic imide-containing acrylate or a cyclic imide-containing methacrylate to the blend of monomers. The adhesive bonds made from the composition of the present disclosure can better withstand exposure to high temperature and high humidity followed by storage in a freezer as shown in Table 6.

Some Embodiments of the Disclosure

In a first embodiment, the present disclosure provides a composition comprising:

a blend of monomers comprising at least one of a cyclic imide-containing acrylate or a cyclic imide-containing methacrylate; and an organoborane complex.

In a second embodiment, the present disclosure provides the composition of the first embodiment, packaged as a two-part composition, wherein a first part comprises the blend of monomers, and wherein a second part comprises the organoborane complex.

In a third embodiment, the present disclosure provides the composition of the second embodiment, wherein the first part further comprises a decomplexing agent for the organoborane complex.

In a fourth embodiment, the present disclosure provides the composition of the third embodiment, wherein the decomplexing agent comprises at least one of an acid, an anhydride, an aldehyde, a β-ketone, an isocyanate, an acid chloride, or a sulfonyl chloride.

In a fifth embodiment, the present disclosure provides the composition of any one of the second to fourth embodiments, wherein at least one of the first part or the second part further comprises a salt of a positively charged metal capable of having at least two oxidation states.

In a sixth embodiment, the present disclosure provides the composition of the fifth embodiment, wherein the salt of a positively charged metal comprises at least one of copper (II) bromide, copper (II) chloride, copper (II) 2-ethylhexanoate, iron (III) bromide, vanadium (III) bromide, chromium (III) bromide, ruthenium (III) bromide, copper (II) tetrafluoroborate, copper (II) trifluoromethanesulfonate, copper (II) naphthenate, copper (I) bromide, iron (II) bromide, manganese (II) bromide, cobalt (II) bromide, nickel (II) bromide, antimony (III) bromide, or palladium (II) bromide.

In a seventh embodiment, the present disclosure provides the composition of any one of the second to sixth embodiments, wherein at least one of the first part or the second part further comprises a toughening agent.

In an eighth embodiment, the present disclosure provides the composition of the seventh embodiment, wherein the toughening agent comprises at least one of an elastomer or a core-shell polymer.

In a ninth embodiment, the present disclosure provides the composition of any one of the second to eighth embodiments, wherein at least one of the first part or the second part further comprises at least one of a filler, a rheology modifier, a reactive diluent, or a plasticizer.

In a tenth embodiment, the present disclosure provides the composition of the ninth embodiment, wherein the rheology modifier is fumed silica, and wherein the filler comprises ceramic beads.

In an eleventh embodiment, the present disclosure provides the composition of the first embodiment, further comprising a decomplexing agent for the organoborane complex.

In a twelfth embodiment, the present disclosure provides the composition of the eleventh embodiment, wherein the decomplexing agent comprises at least one of an acid, an anhydride, an aldehyde, a β-ketone, an isocyanate, an acid chloride, or a sulfonyl chloride.

In a thirteenth embodiment, the present disclosure provides the composition of any one of the first, eleventh, or twelfth embodiments, further comprising a salt of a positively charged metal capable of having at least two oxidation states.

In a fourteenth embodiment, the present disclosure provides the composition of the thirteenth embodiment, wherein the salt of a positively charged metal comprises at least one of copper (II) bromide, copper (II) chloride, copper (II) 2-ethylhexanoate, iron (III) bromide, vanadium (III) bromide, chromium (III) bromide, ruthenium (III) bromide, copper (II) tetrafluoroborate, copper (II) trifluoromethanesulfonate, copper (II) naphthenate, copper (I) bromide, iron (II) bromide, manganese (II) bromide, cobalt (II) bromide, nickel (II) bromide, antimony (III) bromide, or palladium (II) bromide.

In a fifteenth embodiment, the present disclosure provides the composition of any one of the first or eleventh to fourteenth embodiments, further comprising a toughening agent.

In sixteenth embodiment, the present disclosure provides the composition of the fifteenth embodiment, wherein the toughening agent comprises at least one of an elastomer or a core-shell polymer.

In a seventeenth embodiment, the present disclosure provides the composition of any one of the first or eleventh to sixteenth embodiments, further comprising at least one of a filler, a rheology modifier, a reactive diluent, or a plasticizer.

In an eighteenth embodiment, the present disclosure provides the composition of the seventeenth embodiment, wherein the rheology modifier is fumed silica, and wherein the filler comprises ceramic beads.

In a nineteenth embodiment, the present disclosure provides the composition of any one of the first to eighteenth embodiments, wherein the organoborane complex comprises at least one of an amine, an amidine, a hydroxide, or an alkoxide.

In a twentieth embodiment, the present disclosure provides the composition of any one of the first to nineteenth embodiments, wherein the organoborane complex is represented by formula:

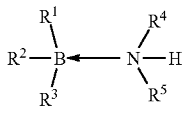

wherein

- $R^1$ is alkyl having from 1 to 10 carbon atoms;
- $R^2$ and $R^3$ are each independently alkyl having from 1 to 10 carbon atoms or aryl;
- $R^4$ and $R^5$ are each independently hydrogen, alkyl having from 1 to 10 carbon atoms, arylalkylenyl, polyoxyalkylenyl, or alkyl, arylalkylenyl, or polyoxyalkylenyl terminated by a primary or secondary amino group or a primary or secondary amino group complexed to $R^1B(R^2)R^3$, or $R^4$ and $R^5$ together with the nitrogen atom to which they are attached join to form a 3- to 7-membered ring.

In a twenty-first embodiment, the present disclosure provides the composition of any one of the first to twentieth embodiments, wherein the blend of monomers comprises at least one of an acrylic ester of an alkanol having from 1 to 12 carbon atoms, a methacrylic ester of an alkanol having from 1 to 12 carbon atoms, tetrahydrofurfuryl acrylate, or tetrahydrofurfuryl methacrylate.

In a twenty-second embodiment, the present disclosure provides the composition of any one of the first to twenty-first embodiments, wherein the at least one of a cyclic imide-containing acrylate or a cyclic imide-containing methacrylate is represented by formula:

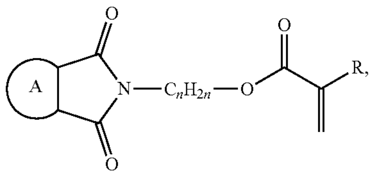

wherein A represents a saturated, unsaturated, or aromatic ring, n is an integer from 1 to 18, and R is hydrogen or methyl.

In a twenty-third embodiment, the present disclosure provides the composition of the twenty-second embodiment, wherein A is a saturated, six-membered ring, and wherein n is an integer from 2 to 6.

In a twenty-fourth embodiment, the present disclosure provides the composition of any one of the first to twenty-third embodiments, wherein the cyclic imide-containing acrylate or the cyclic imide-containing methacrylate is present in an amount of 5 wt. %, at least 10 wt. %, or at least 15 wt. %, based on the total weight of the monomers in the composition and/or up to 50 wt. %, 40 wt. %, 30 wt. %, or 25 wt. %, based on the total weight of the monomers in the composition.

In a twenty-fifth embodiment, the present disclosure provides the composition of any one of the first to twenty-fourth embodiments, blend of monomers is a blend of acrylic monomers.

In a twenty-sixth embodiment, the present disclosure provides an article bonded with the composition of any one of the first to twenty-fifth embodiments, wherein the composition is at least partially cured, and wherein the article comprises at least one low-surface-energy plastic.

In a twenty-seventh embodiment, the present disclosure provides the article of the twenty-sixth embodiment, wherein the article further comprises at least one of metal or glass.

In a twenty-eighth embodiment, the present disclosure provides a method of making a bonded article comprising a first substrate and a second substrate, the method comprising:

- applying the composition of any one of the first, eleventh to eighteenth embodiments or any one of the nineteenth to twenty-fifth embodiments as dependent on any one of the first or eleventh to eighteenth embodiments on at least one of the first substrate or the second substrate;
- adhering the first substrate and the second substrate using the composition; and
- allowing the adhesive composition to at least partially cure to make the bonded article.

In a twenty-ninth embodiment, the present disclosure provides a method of making a bonded article comprising a first substrate and a second substrate, the method comprising:

combining the first part and the second part of the composition of any one of the second to tenth embodiments or any one of the nineteenth to twenty-fifth embodiments as dependent on any one of the second to tenth embodiments to provide an adhesive composition;

applying the adhesive composition on at least one of the first substrate or the second substrate;

adhering the first substrate and the second substrate using the adhesive composition; and allowing the adhesive composition to at least partially cure to make the bonded article.

In a thirtieth embodiment, the present disclosure provides the method of the twenty-eighth or twenty-ninth embodiment, wherein at least one of the first substrate or the second substrate comprises a low-surface-energy plastic.

In a thirty-first embodiment, the present disclosure provides the method of the thirtieth embodiment, wherein the method is carried out without subjecting the low-surface-energy plastic to flame treatment, corona discharge, plasma treatment, oxidation by ozone or oxidizing acids, sputter etching, primer treatment, or any combination thereof.

In a thirty-second embodiment, the present disclosure provides the method of any one of the twenty-eighth to thirty-first embodiments, wherein at least one of the first substrate or the second substrate comprises at least one of metal or glass.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Dibutyl itaconate and succinic anhydride were obtained from Sigma-Aldrich, St. Louis, MO, and the other reagents were obtained from suppliers listed in Table 1, below. The following abbreviations are used in this section: in.=inches, cm=centimeters, g=grams, min=minutes, ° C.=degrees Celsius, ° F.=degrees Fahrenheit, lb.=pound, kN=kiloNewton, psi=pounds per square inch, $N/m^2$=Newtons per square meter, RH=relative humidity, mmHg=millimeters of mercury, and rpm=revolutions per minute.

TABLE 1

Materials

| Abbreviation | Description and Source |
|---|---|
| THEMA | Tetrahydrofurfuryl methacrylate, obtained under the trade designation "VISIOMER THEMA", from Evonik Performance Materials GmbH, Essen, Germany |
| 2-EHMA | 2-ethylhexyl methacrylate, obtained under the trade designation "VISIOMER EHMA", from Evonik Performance Materials GmbH, Essen, Germany |
| Blendex 362 | Methylmethacrylate-butadiene-styrene (MBS) core-shell toughening agent, obtained under the trade designation "BLENDEX 362", from Galata Chemicals, Hahnville, LA |
| Enviropsheres SL-300 | Ceramic spacer beads, 150-300 μm in diameter, obtained under the trade designation "ENVIROSPHERES SL-300", from Palmer Holland, North Ohlmsted, OH |

TABLE 1-continued

Materials

| Abbreviation | Description and Source |
|---|---|
| Miramer M1089 | 2-(hexahydrophthalimido)-ethyl methacrylate, obtained under the trade designation "MIRAMER M1089" from Miwon Chemical, Gyeonggi-do, South Korea |
| Copper (II) Naphthenate | Copper naphthenate 8% in mineral spirits, obtained from Strem Chemicals, Newburyport, MA |
| CAB-O-SIL TS-720 | Fumed silica which has been surface modified with octyltrimethoxysilane, obtained under the trade designation "CAB-O-SIL TS-720", from Cabot Corp., Billerica, MA |
| NK Ester SA | β-Methacryloyl oxyethyl hydrogen succinate obtained under the trade designation "NK ESTER SA", from Shin-Nakamura Chemical Co. LTD, Wakayama City, Japan |
| Part A | An accelerator obtained from 3M Company, St. Paul, MN, under the trade designation "3M SCOTCH-WELD DP8010NS" Acrylic Adhesive, which contains a complex of triethylborane and 1,6-hexanediamine dissolved in "CX-100" (DSM NeoResins, Inc., Wilmington, MA) |

Test Methods

Overlap Shear (OLS)

The resulting mixed adhesives were used to prepare overlap shear test samples on polypropylene, glass-filled polypropylene, and galvanized steel. All polypropylene coupon samples, obtained from Plastics International, Eden Prairie, MN, were 0.32 cm×2.54 cm×10.2 cm (⅛ in.×1 in.×4 in.) and were only wiped with isopropanol alcohol prior to bonding. Glass-filled polypropylene, obtained under the trade designation "VERSITEX", from US Liner Company, Cranberry Township, PA, were 0.32 cm×20.3 cm×30.5 cm (⅛ in.×8 in.×12 in.) sheets and cut to 0.32 cm×2.54 cm×20.3 cm (⅛ in.×1 in.×8 in.) coupon samples. These were wiped with isopropanol alcohol before applying the adhesive composition. Galvanized steel coupon samples, obtained from Joseph T. Ryerson and Son, Inc., Coon Rapids, MN, were 2.54 cm×10.16 cm×0.16 cm (1 in.×4 in.×1/16 in.) and were prepared using one of three methods: (1) only wiped with isopropanol alcohol prior to bonding, or (2) abraded with a pad with the trade designation "SCOTCHBRITE" (3M Company, St. Paul, MN) and mounted on an elastic palm sander followed by wiping with isopropanol alcohol prior to bonding, or (3) grit-blasted using fine mesh sand. A 1.27-cm (½ in.) or 2.54-cm (1 in.) overlap was used when preparing the overlap shear samples. The bond line was clamped with binder clips during cure and the clips were removed after 90 minutes or 24 hours at 25° C. Testing was run on a 5,000 lb. (22 kN) load cell for overlap shear. Polypropylene/polypropylene overlap shear samples were run at 2 in./min. and polypropylene/galvanized overlap shear samples were run at 0.1 in./min (0.25 cm/min.). The peak stress values (psi) were reported, and each value an average of three specimens. Samples prepared are reported in Table 5, and results from testing are reported in Table 6.

OLS Cataplasmic Aging

Galvanized/polypropylene (free or glass-filled) OLS samples were prepared as described above, except using a 1 in. (2.54-cm) overlap, were conditioned in a 150° F. (66° C.) and 95% RH chamber for 21 days, whereupon they were removed and immediately placed in a −40° F. (−40° C.) freezer and conditioned for a further 24 hours. After a 24-hour period of equilibration at 25° C. the specimens were tested according to the above detailed OLS procedure. Samples prepared are reported in Table 5, and results from testing are reported in Table 6.

Example 1

Example 1 was prepared by combining components in the amounts indicated in Table 2 in a polypropylene MAX 600 DAC cup (FlackTek, Inc., Landrum, SC). The combined components were speed mixed with a SPEEDMIXER DAC 400.2 VAC (FlackTek, Inc., Landrum, SC) for 4 minutes at 2000 rpm. The adhesive mixture, which warmed upon mixing, was allowed to cool. The final adhesive "Part B" mixture was then degassed by capping the mixing cup with a polypropylene lid that contained a vent hole and high-shear mixed under reduced pressure (33 mm Hg) for 2 minutes at 1750 rpm. The adhesive "Part B" mixture was loaded into the 10-part side of a 10:1 dual syringe cartridge dispenser, using the accelerator "Part A" with the trade designation "3M SCOTCH-WELD DP80 IONS" Acrylic Adhesive (3M Company, St. Paul, MN) in the 1-part side of the dispenser. All bonds for overlap shear testing were prepared by dispensing approximately 0.3 grams of adhesive resin mixture and the accelerator resin through a static mixing tip.

TABLE 2

Example 1 "Part B" Mixture

| Material | wt (g) | wt % |
|---|---|---|
| THEMA | 26 | 40 |
| Cab-O-Sil TS-720 | 1.313 | 2.02 |
| 2-EHMA | 9.1 | 14 |
| M1089 | 9.1 | 14 |
| Dibutyl Itaconate | 2.6 | 4 |
| Succinic Anhydride | 0.3445 | 0.53 |
| Blendex 362 | 14.651 | 22.54 |
| Copper (II) Napthenate | 0.5915 | 0.91 |
| Envirosphere SL300 | 1.3 | 2 |
| | 65 | 100 |

Comparative Example A

Comparative Example A was prepared as described in Example 1 except that the components in the amounts indicated in Table 3, below, were used for the Part B mixture.

TABLE 3

Comparative Example A "Part B" Mixture

| Material | wt. (g) | wt. % |
|---|---|---|
| THEMA | 123.575 | 49.43 |
| Cab-O-Sil TS-720 | 5.05 | 2.02 |
| 2-EHMA | 45.75 | 18.3 |
| Dibutyl Itaconate | 10 | 4 |
| Succinic Anhydride | 1.325 | 0.53 |
| Blendex 362 | 57.025 | 22.81 |
| Copper (II) Napthenate | 2.275 | 0.91 |
| Envirosphere SL300 | 5 | 2 |
| | 250 | 100 |

Comparative Example B

Comparative Example B was prepared as described in Example 1 except that the components in the amounts indicated in Table 4, below, were used for the Part B mixture.

TABLE 4

Comparative Example B "Part B" Mixture

| Material | wt. % |
|---|---|
| THEMA | 45.9 |
| Cab-O-Sil TS-720 | 2.02 |
| 2-EHMA | 15.34 |
| Dibutyl Itaconate | 3.94 |
| Succinic Anhydride | 0.53 |
| Blendex 362 | 22.81 |
| Copper (II) Napthenate | 0.91 |
| NK Ester SA | 6.55 |
| Envirosphere SL300 | 2 |
| | 100 |

Examples (Ex.) 2 and 3 and Comparative Examples (CE) A1 to A3, B1 and B2

Glass-filled polypropylene (VR2) and galvanized steel coupons were prepared as described in the OLS test method above. The Example 1 and CE A and B compositions were evaluated. The coupon preparation and adhesive composition used for each of Ex. 2 and 3 and CE A1 to A3, B1, and B2 are shown in Table 5, below.

TABLE 5

Adhesive OLS and OLS Cataplasmic Aging Samples

| Example | Adhesive | Overlap (in.) | Side of VR2 used | VR2 Prep | Galvanized Steel Prep |
|---|---|---|---|---|---|
| CE B1 | CE B | 1.0 | Smooth | IPA wipe | IPA wipe |
| CE A1 | CE A | 0.5 | Honeycomb | IPA wipe | IPA/Abrade/IPA |
| CE A2 | CE A | 1.0 | Smooth | IPA wipe | IPA wipe |
| Ex. 2 | Ex. 1 | 1.0 | Smooth | IPA wipe | IPA wipe |
| CE B2 | CE B | 1.0 | Smooth | IPA wipe | IPA/Sandblast/IPA |
| CE A3 | CE A | 1.0 | Smooth | IPA wipe | IPA/Sandblast/IPA |
| Ex. 3 | Ex. 1 | 1.0 | Smooth | IPA wipe | IPA/Sandblast/IPA |

The results from OLS testing are shown in Table 6, below. AF refers to adhesive failure, CF to cohesive failure, SF to substrate failure, and MF to mixed failure in Table 6, below. For Ex. 2, the value is an average of less than three samples since for some of the samples, the peak stress was below the calibration threshold of the load cell. In Table 6, <10 psi means that the value is below the calibration threshold of the load cell, which is 10 psi (69,000 N/$m^2$).

TABLE 6

| Results for Overlap Shear (OLS) Testing and OLS Cataplasmic Aging Testing | | | | | | |
|---|---|---|---|---|---|---|
| | OLS 90 min. cure | | OLS 24 hour cure | | OLS after cataplasmic aging | |
| Example | psi ($N/m^2$) | Failure Mode | psi ($N/m^2$) | Failure Mode | psi ($N/m^2$) | Failure Mode |
| CE B1 | 11 (76,000) | AF- steel | 790 ($5.4 \times 10^6$) | MF (AF/SF) | <10 (69,000) | AF |
| CE A1 | 154 ($1.06 \times 10^6$) | AF - steel | 667 ($4.60 \times 10^6$) | AF - steel | <10 (69,000) | AF |
| CE A2 | 13 (89,600) | AF - steel | 567 ($3.91 \times 10^6$) | MF (AF/SF) | <10 (69,000) | AF |
| Ex. 2 | 445 ($3.07 \times 10^6$) | AF - steel | 843 ($5.81 \times 10^6$) | MF (AF/SF) | 100 ($6.9 \times 10^5$) | MF |
| CE B2 | 40.5 (279,000) | AF - steel | 280 ($1.9 \times 10^6$) | MF (AF/CF) | 694 ($4.79 \times 10^6$) | AF |
| CE A3 | 41.5 (286,000) | AF - steel | 339 ($2.34 \times 10^6$) | AF | 640.8 ($4.42 \times 10^6$) | AF |
| Ex. 3 | 607.9 ($4.19 \times 10^6$) | no failure (load cell limit) | 1068 ($7.36 \times 10^6$) | SF | 915 ($6.31 \times 10^6$) | AF |

Examples (Ex.) 4 and 5 and Comparative Examples (CE) B3 and B4

The Example 1 and CE B compositions were evaluated on polypropylene (PP)-polypropylene bonds and PP-galvanized steel bonds. A 0.5-in. (1.27-cm) overlap was used to adhere the coupons. Polypropylene coupons were wiped with isopropanol alcohol before bonding. Galvanized steel samples were wiped with isopropanol alcohol, grit-blasted using fine mesh sand, and wiped with isopropanol again before bonding. The substrates and adhesive composition used for each of Ex. 4 and 5 and CE B3 and B4 are shown in Table 7, below. OLS testing of Examples 4 and 5 and Comparative Examples B3 and B4 after curing for 24 hours at 25° C. resulted in substrate failure (SF) for all the samples.

TABLE 7

| Examples (Ex.) 4 and 5 and Comparative Examples (CE) B3 and B4 | | | | |
|---|---|---|---|---|
| Example | Adhesive | First Substrate | Second Substrate | OLS Failure Mode |
| Ex. 4 | Ex. 1 | polypropylene | galvanized steel | SF |
| CE B3 | CE B | polypropylene | galvanized steel | SF |
| Ex. 5 | Ex. 5 | polypropylene | polypropylene | SF |
| CE B4 | CE B | polypropylene | polypropylene | SF |

The preceding description, given in order to enable one of ordinary skill in the art to practice the claimed disclosure, is not to be construed as limiting the scope of the disclosure, which is defined by the claims and all equivalents thereto.

What is claimed is:

1. A composition comprising:

a blend of monomers comprising at least one of a cyclic imide-containing acrylate or a cyclic imide-containing methacrylate; and an organoborane complex.

2. The composition of claim 1, packaged as a two-part composition, wherein a first part comprises the blend of monomers, and wherein a second part comprises the organoborane complex.

3. The composition of claim 2, wherein the first part further comprises at least one of a decomplexing agent for the organoborane complex or a salt of a positively charged metal capable of having at least two oxidation states.

4. The composition of claim 1, further comprising at least one of a decomplexing agent for the organoborane complex or a salt of a positively charged metal capable of having at least two oxidation states.

5. The composition of claim 3, wherein the decomplexing agent comprises at least one of an acid, an anhydride, an aldehyde, a β-ketone, an isocyanate, an acid chloride, or a sulfonyl chloride.

6. The composition of claim 4, wherein the salt comprises at least one of copper (II) bromide, copper (II) chloride, copper (II) 2-ethylhexanoate, iron (III) bromide, vanadium (III) bromide, chromium (III) bromide, ruthenium (III) bromide, copper (II) tetrafluoroborate, copper (II) trifluoromethanesulfonate, copper (II) naphthenate, copper (I) bromide, iron (II) bromide, manganese (II) bromide, cobalt (II) bromide, nickel (II) bromide, antimony (III) bromide, or palladium (II) bromide.

7. The composition of claim 1, wherein the organoborane complex comprises at least one of an amine, an amidine, a hydroxide, or an alkoxide.

8. The composition of claim 1, wherein the organoborane complex is represented by formula:

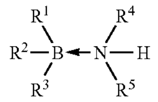

wherein $R^1$ is alkyl having from 1 to 10 carbon atoms;

$R^2$ and $R^3$ are each independently alkyl having from 1 to 10 carbon atoms or aryl;

$R^4$ and $R^5$ are each independently hydrogen, alkyl having from 1 to 10 carbon atoms, arylalkylenyl, polyoxyalkylenyl, or alkyl, arylalkylenyl, or polyoxyalkylenyl terminated by a primary or secondary amino group or a primary or secondary amino group complexed to $R^1B(R^2)R^3$, or $R^4$ and $R^5$ together with the nitrogen atom to which they are attached join to form a 3- to 7-membered ring.

9. The composition of claim 1, further comprising at least one of a toughening agent, a filler, a reactive diluent, or a plasticizer.

10. The composition of claim 1, wherein the blend of monomers comprises at least one of an acrylic ester of an alkanol having from 1 to 12 carbon atoms, a methacrylic ester of an alkanol having from 1 to 12 carbon atoms, tetrahydrofurfuryl acrylate, or tetrahydrofurfuryl methacrylate.

11. The composition of claim 1, wherein the at least one of a cyclic imide-containing acrylate or a cyclic imide-containing methacrylate is represented by formula:

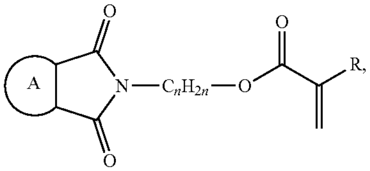

wherein A represents a saturated, unsaturated, or aromatic ring, n is an integer from 1 to 18, and R is hydrogen or methyl.

12. An article bonded with the composition of claim 1, wherein the composition is at least partially cured, and wherein the article comprises at least one low-surface-energy plastic.

13. A method of making a bonded article comprising a first substrate and a second substrate, the method comprising:

applying the composition of claim 1 on at least one of the first substrate or the second substrate;

adhering the first substrate and the second substrate using the composition; and allowing the composition to at least partially cure to make the bonded article.

14. A method of making a bonded article comprising a first substrate and a second substrate, the method comprising:

combining the first part and the second part of the composition of claim 2 to provide an adhesive composition;

applying the adhesive composition on at least one of the first substrate or the second substrate;

adhering the first substrate and the second substrate using the adhesive composition; and allowing the adhesive composition to at least partially cure to make the bonded article.

15. The method of claim 14, wherein at least one of the first substrate or the second substrate comprises at least one of a low-surface-energy plastic, a metal, or glass.

16. The composition of claim 3, wherein the decomplexing agent comprises at least one of an acid, an anhydride, an aldehyde, a β-ketone, an isocyanate, an acid chloride, or a sulfonyl chloride.

17. The composition of claim 3, wherein the salt comprises at least one of copper (II) bromide, copper (II) chloride, copper (II) 2-ethylhexanoate, iron (III) bromide, vanadium (III) bromide, chromium (III) bromide, ruthenium (III) bromide, copper (II) tetrafluoroborate, copper (II) trifluoromethanesulfonate, copper (II) naphthenate, copper (I) bromide, iron (II) bromide, manganese (II) bromide, cobalt (II) bromide, nickel (II) bromide, antimony (III) bromide, or palladium (II) bromide.

18. The composition of claim 2, wherein the organoborane complex comprises at least one of an amine, an amidine, a hydroxide, or an alkoxide.

19. The composition of claim 2, wherein the organoborane complex is represented by formula:

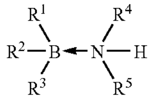

wherein $R^1$ is alkyl having from 1 to 10 carbon atoms;

$R^2$ and $R^3$ are each independently alkyl having from 1 to 10 carbon atoms or aryl;

$R^4$ and $R^5$ are each independently hydrogen, alkyl having from 1 to 10 carbon atoms, arylalkylenyl, polyoxyalkylenyl, or alkyl, arylalkylenyl, or polyoxyalkylenyl terminated by a primary or secondary amino group or a primary or secondary amino group complexed to $R^1B(R^2)$ $R^3$, or $R^4$ and $R^5$ together with the nitrogen atom to which they are attached join to form a 3- to 7-membered ring.

20. The composition of claim 2, wherein the blend of monomers comprises at least one of an acrylic ester of an alkanol having from 1 to 12 carbon atoms, a methacrylic ester of an alkanol having from 1 to 12 carbon atoms, tetrahydrofurfuryl acrylate, or tetrahydrofurfuryl methacrylate.

* * * * *